United States Patent [19]

Oppermann

[11] Patent Number: 5,477,777
[45] Date of Patent: Dec. 26, 1995

[54] APPLIANCE FOR HEATING UP AND/OR KEEPING WARM OF FOOD AND BEVERAGES

[76] Inventor: Rolf Oppermann, Scheffelstrasse 7, 63071 Offenbach, Germany

[21] Appl. No.: 270,299

[22] Filed: Jul. 5, 1994

[30] Foreign Application Priority Data

Jul. 4, 1993 [DE] Germany .......................... 43 22 152.1

[51] Int. Cl.⁶ .................................................. A47J 39/02
[52] U.S. Cl. .................... 99/422; 99/449; 99/483; 219/447; 219/457
[58] Field of Search .............................. 99/385, 393, 399, 99/403, 422, 425, 449, 483; 219/443, 447, 455, 457, 458, 459, 464, 438; 206/223, 546, 544, 576

[56] References Cited

U.S. PATENT DOCUMENTS 1,959,198  5/1934  Conry ...................................... 219/443
3,739,148  6/1973  Ryckman, Jr. ............................ 99/422
4,268,741  5/1981  O'Brien ................................... 99/447
4,430,559  2/1984  Rabay ..................................... 99/422
5,129,314  7/1992  Hu ......................................... 99/422

FOREIGN PATENT DOCUMENTS 78 25 036  12/1978  Germany .
33 45 859  6/1985  Germany .
37 09 102  9/1988  Germany .

Primary Examiner—David Scherbel
Assistant Examiner—Reginald L. Alexander
Attorney, Agent, or Firm—Millen, White, Zelano & Branigan

[57] ABSTRACT

The invention concerns an appliance for heating up and keeping warm of food or beverages comprising at least one food container and one heating element and is easy to operate and to clean as well as allowing an even heating up of food, containing an electrical temperature control preventing overheating.

20 Claims, 2 Drawing Sheets

APPLIANCE FOR HEATING UP AND/OR KEEPING WARM OF FOOD AND BEVERAGES

SUMMARY OF THE INVENTION

The invention concerns an appliance for heating up and/or keeping warm food and beverages.

Plate warmers or appliances for keeping serving dishes warm are well known. See, for example, DE 37 09 102 A1, DE 33 45 859 A1 or DE 78 25 036 U1.

All these heating appliances, which usually find usage as fondue-rechauds, plate warmers or table cookers have in common that they exhibit a one-piece assembly, which means that the heating element and the dish containers form a single unit. Containers which surround the dishes as well as possible and therefore contain and insolate them satisfactorily do not exist or are inseparably connected with the heating element. This results in a technically nonsatisfactory assembly, particularly as first of all there is no effective utilization of the heating capability. Further, the one-piece appliances cannot be optimally cleaned because, as everyone knows, the heating elements have to be protected from moisture. In addition, sufficient stability for the dishes inserted is not guaranteed; thus, safe and simple operation is not possible.

The keeping warm of dishes, containers and food is of immense importance, especially in catering at old people's homes, such as nursing homes, certain areas of hospitals and in the nourishment of small children and the disabled because of the slow consumption of food. As a result, there is a great demand for a warming appliance which not only provides the function of keeping food warm but also can be used at the table at mealtimes.

For example, there is a need for a warming appliance which satisfies the following objectives:

long and even warming of the food without overheating;

high stability of the appliance, including those portions which are to be kept warm;

simple and safe operation without any risk of injury;

guarantee for special hygienic demands and the ability of simple but thorough cleaning;

long durability;

a low consumption of electricity; and great mobility; without impairing the effectiveness of the appliance.

Thus, an object of the invention is to solve the problem of providing an appliance for warming and heating up food or beverages which is simple in construction as well as easy to operate, which can especially be used in old people's homes and hospitals or to nourish small children or the disabled without the above-mentioned disadvantages and which satisfactorily fulfills the objectives listed above as well.

Upon further study of the specification and appended claims, further objects and advantages of this invention will become apparent to those skilled in the art.

This invention is such an appliance which meets these objectives.

According to the invention, there is provided an appliance which can evenly keep food or beverages warm and/or heat up food or beverages wherein the appliance comprises two or more parts and has at least one container and at least one heating element which can be separated from one another manually and cleaned without the use of any tools.

In accordance with the invention, electronically controlled heating elements of the appliance can be easily separated from the container by hand. Since a heating element can be combined with several different containers, an adequate container can be chosen for any occasion to optimally contain and insolate the corresponding food. This also permits an effective use of the heat developed for warming and a reduction in the consumption of electricity to a minimum. This is further enhanced by the use of electronically controlled heating elements which use a very low power level, for example, less than 50 watts.

The container can, as mentioned before, be separated with one movement, without using any additional tools. The stability and steadfastness of the appliance will not be effected when the parts are connected. The advantage of the easy separation of the heating element from the container permits an easy cleaning of the container which is exposed to heavy soiling from residues.

In accordance with an embodiment of the invention, the heating element is of a flat, planar shape such as a disc, oval, square, etc., having an upper planar surface, a lower planar surface and a peripheral edge surface. The peripheral edge surface exhibits a projection, e.g., a rib. Furthermore, the container is provided with an opening corresponding to the shape of the heating element, e.g., disc, oval, square, etc., wherein the side wall of the opening exhibits a recess of a size and shape such that the projection on the peripheral edge of the heating element will fit into the recess. In this manner, the heating element locks into or snaps into the container such that the projection on the peripheral edge of the heating element engages the recess in the side wall of the opening of the container similar to a tongue-in-groove arrangement. In this regard, the container exhibits a sufficient rigidity so as to serve the function of holding food. However, at the same time, the container exhibits sufficient flexibility so that, for example, the application of pressure onto the heating element will disengage the projection of the heating element from the recess within the side wall of the container opening, thereby separating the heating element from the food container.

One advantage achieved through this invention is that the soiled part of the appliance can be separated from the heating element without problems and be cleaned in wash water even in more efficient industrial dishwashers.

The highly hygienic demands for use in nursing homes, hospitals, homes for the disabled or other public facilities are thus more than efficiently fulfilled.

In addition, with the appliance according to the invention, an easy exchange of the container with different utensils like plates, pots, bottles, coffee or tea pots is possible, making a combination of different containers possible to accommodate larger food containers so that the appliance can include several containers.

The containers are made of plastic material which is suitable for serving and heating food, is heat resistant, and also is preferably dishwasher safe. The type of material is not critical. Nevertheless, it is advantageous to use a plastic material which has an especially high durability and therefore ensures long usage.

The appliance has several openings at the base which permit cable-connections to several parts, and at the same time, assures good circulation during operation.

Another advantage of this invention is that the lid of the container so surrounds the heating element preventing it from being touched by liquids and left-overs. Long usage of the heating element is thus guaranteed, and the operational safety is increased, as short circuits due to moisture are eliminated.

The heating element preferably has an electrical temperature control device and an overheating protection system. The heating element can be connected to 100–240 volt source, e.g., 110 volt or 220 volt, or used with alternating current control units or batteries. Because of such a large margin of voltage the appliance can be operated in countries using such high voltage and therefore is useful in traveling. High mobility is also achieved through the usage of alternating current control units or batteries.

The heating element is preferably teflon-coated, has a smooth surface and can be easily cleaned.

The appliance guarantees simple and safe operation. Preferably, the appliance construction is designed so that the containers and the heating elements fit together in only one way, thereby avoiding any and all accidental dangers in connecting.

The appliance guarantees safe and comfortable operation and fulfills all the requirements mentioned above, even under extreme conditions.

From the foregoing description, one skilled in the art can easily ascertain the essential characteristics of this invention and, without departing from the spirit and scope thereof, can make various changes and modifications of the invention to adapt it to various usages and conditions.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

The entire disclosure of all applications, patents and publications, cited above and below, and of corresponding German application P 43 22 152.1, are hereby incorporated by reference.

BRIEF DESCRIPTION OF THE DRAWINGS

In FIG. 1, a plate warmer in accordance with the invention is shown. The references numerals 1–5 represent the following features:

(1) Food container;

(2) Electrical connection;

(3) Cord connection with fuse;

(4) Lower part of the heating element; and (5) Heating element with electrical control.

DESCRIPTION OF THE DRAWINGS

Figure 1:
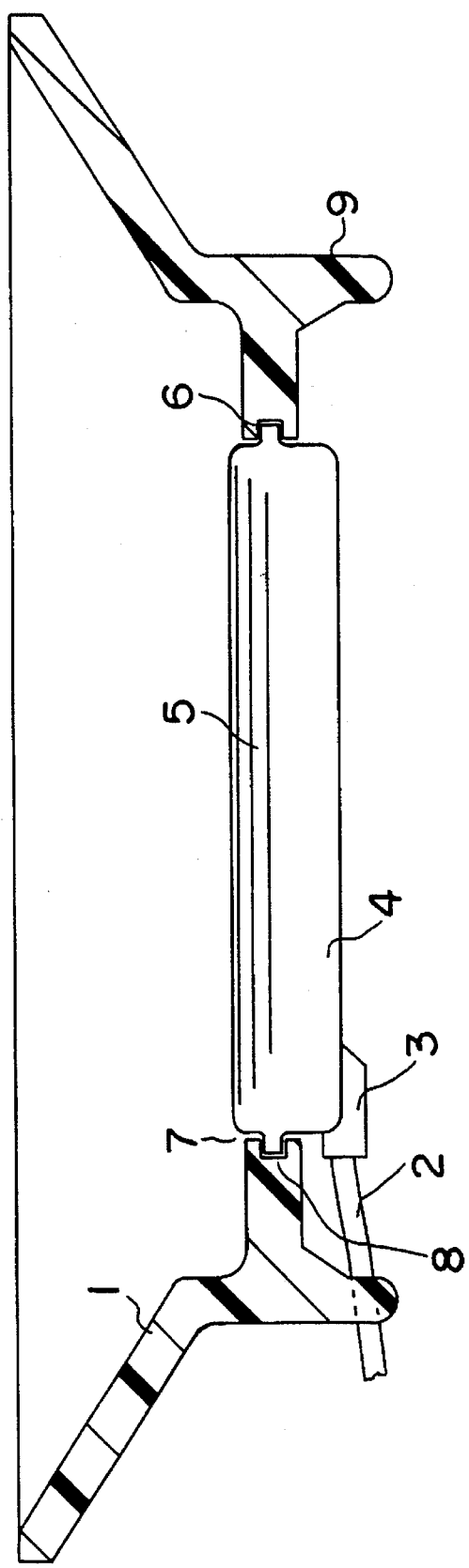
FIG. 1 illustrates an embodiment according to the invention.
Figure 2A:
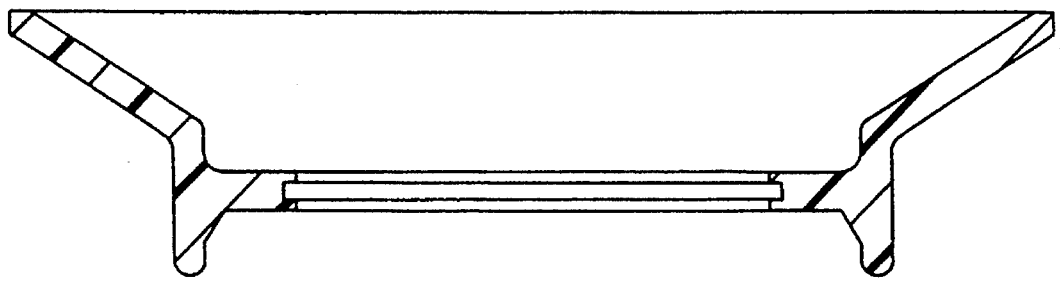
Figure 2B:
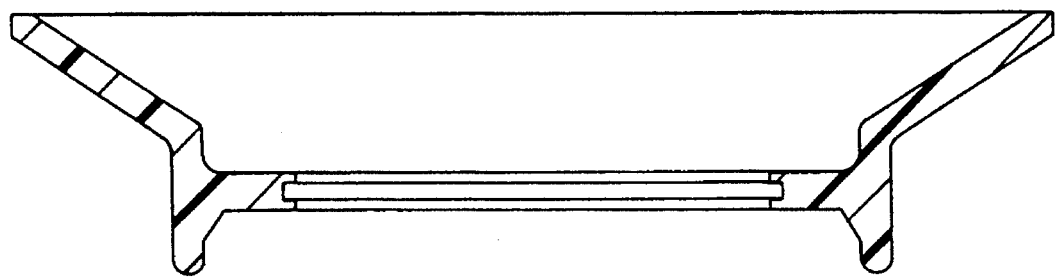
Figure 2C:
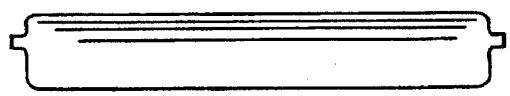

In FIG. 1, heating element 5 is of a planar structure such as a disc, possessing a top surface, a lower surface and a peripheral edge or side wall. The side wall exhibits a rib-like projection 6.

The bottom surface of food container 1 exhibits an opening 7 which is of a shape corresponding to the shape of the top surface of heating element 5. The opening 7 has a side wall exhibiting a recess 8. As shown in FIG. 1, projection 6 of heating element 5 is positioned within the recess 8 of the side wall of opening 7. In this arrangement, the top surface of heating element 5 forms a portion of the bottom internal surface of food container 1.

Food container 1, as shown in FIG. 1, also exhibit side walls which project upward and outward from the internal bottom surface thereof. Furthermore, food container 1 is provided with downward-extending projections 9 so that, when the food container and heating element are combined together, a space is defined between the bottom surface of the food container and a substrate upon which the container rests. As a result, the bottom surface of heating element 5 is displaced from the surface of the substrate. The downwardly-extending projections can be, for example, a plurality of leg flanges or a peripheral web.

In any event, it is desirable that the downward-extending projections 9 provide passageways so that the cord connection 3 can be easily attached to lower part 4 of the heating element 5.

What is claimed is:

1. An appliance for heating food comprising:

a food container comprising a bottom wall, one or more side walls extending upward from said bottom wall, and at least one support member extending downward from said bottom wall; and a heating element of planar shape comprising a top surface, a bottom surface, a side wall, and a rib projection extending outward from said side wall;

wherein said bottom wall of said food container has an opening corresponding to the shape of said top surface of said heating element, said opening being defined by a side wall having a recess and said recess having a shape corresponding to the shape of said projection;

wherein said food container and heating element can be removably connected to one another by inserting said top surface of said heating element into said opening whereby said rib projection is removably locked into said recess.

2. An appliance according to claim 1, wherein said food container is made of a plastic material which is suitable for serving and heating food, is dishwasher safe, and is heat-resistant.

3. An appliance according to claim 2, further comprising a cover which surrounds said heating element.

4. An appliance according to claim 2, wherein said heating element contains an electrical temperature control with overheating protection.

5. An appliance according to claim 4, wherein said heating element is operated using batteries.

6. An appliance according to claim 4, wherein said heating element is operating using an alternating current control unit.

7. An appliance according to claim 1, further comprising a cover which surrounds said heating element.

8. An appliance according to claim 11, wherein said heating element contains an electrical temperature control with overheating protection.

9. An appliance according to claim 8, wherein said heating element is operated using batteries.

10. An appliance according to claim 8, wherein said heating element is operating using an alternating current control unit.

11. An appliance according to claim 1, wherein said heating element contains an electrical temperature control with overheating protection.

12. An appliance according to claim 11, wherein said heating element is operated using temperature control with overheating protection.

13. An appliance according to claim 11, wherein said heating element is operating using an alternating current control unit.

14. An appliance according to claim 1, wherein said heating element and said container can be connected in only one correct way and in one simple movement.

15. A food heating appliance kit comprising:

a plurality of food containers, each of said food containers comprising a bottom wall, one or more side walls extending upward from said bottom wall, and at least one support member extending downward from said bottom wall; and a heating element of planar shape comprising a top surface, a bottom surface, a side wall, and a rib projection extending outward from said side wall;

wherein said bottom wall of each of said food containers has an opening corresponding to the shape of said top surface of said heating element, each of said openings being defined by a side wall having a recess and said recess having a shape corresponding to the shape of said projection;

wherein said heating element can be removably connected with each of said food containers by inserting said top surface of said heating element into said opening of each of said food containers, whereby said rib projection is removably locked into said recess.

16. A kit according to claim 15, wherein each of said food containers is made of a plastic material which is suitable for serving and heating food, is dishwasher safe, and is heat-resistant.

17. A kit according to claim 15, further comprising a cover which surrounds said at least one heating element.

18. A kit according to claim 15, wherein said heating element contains an electrical temperature control with overheating protection.

19. A kit according to claim 16, wherein said heating element is operated using batteries.

20. A kit according to claim 16, wherein said heating element is operated using an alternating current control unit.

* * * * *